(12) United States Patent
Adams et al.

(10) Patent No.: US 7,694,232 B2
(45) Date of Patent: Apr. 6, 2010

(54) METHOD AND APPARATUS FOR PROVIDING MINIMAL STATUS DISPLAY

(75) Inventors: Neil P. Adams, Ontario (CA); Michael S. Brown, Ontario (CA); Herbert A. Little, Ontario (CA)

(73) Assignee: Research In Motion Limited, Waterloo, Ontario (CA)

( * ) Notice: Subject to any disclaimer, the term of this patent is extended or adjusted under 35 U.S.C. 154(b) by 1169 days.

(21) Appl. No.: 10/909,842

(22) Filed: Aug. 3, 2004

(65) Prior Publication Data
US 2006/0030295 A1    Feb. 9, 2006

(51) Int. Cl.
*G06F 3/048*    (2006.01)
(52) U.S. Cl. ............... 715/788; 715/771; 715/835; 715/741
(58) Field of Classification Search .......... 715/788, 715/850, 765, 741, 835; 455/410; 702/127; 345/348
See application file for complete search history.

(56) References Cited

U.S. PATENT DOCUMENTS

| | | | | |
|---|---|---|---|---|
| 6,047,197 | A * | 4/2000 | Jarrad | 455/566 |
| 6,941,238 | B2 * | 9/2005 | Tanifuji | 702/127 |
| 7,082,576 | B2 * | 7/2006 | Shahine et al. | 715/789 |
| 2005/0120306 | A1 * | 6/2005 | Klassen et al. | 715/765 |
| 2006/0020904 | A1 * | 1/2006 | Aaltonen et al. | 715/850 |

OTHER PUBLICATIONS

Co-pending U.S. Appl. No. 10/784,781, "Previewing a New Event on a Small Screen Device", Filed Feb. 24, 2004. (Retrievable from PAIR).

Documents issued in the prosecution of U.S. Appl. No. 10/784,781, "Previewing a New Event on a Small Screen Device", Filed Feb. 24, 2004. (Retrieved from PAIR).

Notice of Allowance dated Jan. 12, 2009, Canadian Patent Application No. 2,476,216.

* cited by examiner

*Primary Examiner*—William L Bashore
*Assistant Examiner*—Sherrod Keaton
(74) *Attorney, Agent, or Firm*—Bereskin & Parr LLP/S. E. N. C.R. L., s.r.l.

(57) ABSTRACT

A method and apparatus are provided for a user of a mobile wireless communications device to have the option of viewing security status messages in a large or small format depending upon the user's preferences, form factor of the mobile communications device, or the like. In accordance with an exemplary aspect of the invention, a user may opt to display status icons on one row of a display and include an abbreviated text associated with each icon that is displayed when a particular icon is highlighted by the user. If no icon is highlighted by the user, the most important status text (determined based on predetermined criteria) is displayed. The user has the option of switching to a large status display to view additional information relating to the status icons.

18 Claims, 12 Drawing Sheets

METHOD AND APPARATUS FOR PROVIDING MINIMAL STATUS DISPLAY

BACKGROUND OF THE INVENTION

1. Field of the Invention

The present invention relates generally to mobile wireless communications devices capable of processing cryptographically secure messages and information. In particular, the disclosure is directed to a method and apparatus for providing a user of a mobile wireless communications device with the option of viewing security status messages in a large or small format depending upon the user's preferences, form factor of the mobile communications device, or the like.

2. Related Art

Exchanging cryptographically secured electronic messages and data, such as, for example, e-mail messages, is well known. Typically, the user of a device for receiving such cryptographically secured electronic information, such as, for example, a mobile wireless communications device, is provided with a store containing private keys, certificates, and the like, required for processing various cryptographically secured information. A security message relating to a secured electronic message typically requires displaying a relatively large amount of information to the user relating to the secure message. For example, some common security messages may include information regarding whether a message is encrypted; whether a message is signed; whether a signed message is correctly verified; whether a certificate used to sign a message is from at trusted source, and the like. Icons representing various security conditions as well as accompanying text may be used to represent security information. These types of security messages may be referred to as a security status display.

On larger form factor devices, it is relatively easy to display such security information to a user, including, for example, icons relating to a particular information item, together with text describing details regarding the contents of what a particular icon represents. For example, a large format display technique may include a listing of security messages in a format such as that shown in FIG. 5. The icons provide an indication of status, and the related text offers more details relating to the message associated with a particular icon. The text for each sub-item relating to a particular message that is displayed, for example, using an icon, may be fairly detailed, indicating, for example, the encryption algorithm being used, the name of the sender's certificate, the security encoding being used (e.g., S/MIME, PGP, etc.), as well as very specific error messages relating to each of the displayed items. Each text item may itself take up to several lines of the display, for example, up to three lines of text. Typically, the text is read if the icons indicate warnings or errors.

Problems may arise, for example, for a user that wishes to either view more of the message on the initial screen, or the user wishes to use a small form factor device, such as, for example, a quark, where the display size may be too small to effectively display the full format security messages. What is needed is a method and apparatus for providing a user with a useful level of information on a small form factor device as is available with a device having a larger display area.

BRIEF SUMMARY OF THE INVENTION

In view of the foregoing, we have now recognized the need for a method and apparatus for providing a user of a mobile wireless communications device with the option of viewing, for example, security status messages in a large or small format depending upon the user's preferences, form factor of the mobile communications device, or the like.

To this end, it is advantageous to provide the user with a small or minimal status display using icons that are aligned preferably on a single line of the display, as opposed to each icon being displayed on a separate line of the display. Additionally, the icons themselves may be smaller than those used on larger form factor devices. It is also advantageous to provide abbreviated status text relating to the information being represented by the various small icons. Thus, for example, when a user moves the cursor focus on to one of the displayed icons, the status text peculiar to the selected icon will be displayed. However, even this status text may be abbreviated to capture the essence of the message, but without taking up too much space on the display.

According to another exemplary embodiment, when the cursor is not focused on any particular icon in the small status display, the status text portion of the display may reflect the status of highest importance for a particular message. For example, an error message may be of highest importance, whereas a simple indication that a particular message is encrypted may be of a relatively low importance. The priority scheme associated with the relative message importance is determined, for example, in accordance with the designer's preference.

As a further advantage, an exemplary embodiment provides the user with the option of switching between small and large status displays based on what a user requires. For example, a user may invoke a global setting that may act as a default when a message is first entered. Optionally, the user may switch between the message formats dynamically as each situation dictates. Typically, secure electronic messages verify correctly, which is indicated to the user by the status of the security icons. If there is any problem or error, these are reflected by the appearance of the icons and the user can either determine what the problem is from the short abbreviated text provided with the icons, or may switch to the large format to obtain additional textual information.

These and other advantages attendant therewith are provided by exemplary embodiments of the invention wherein a method and apparatus for providing small status display, including information to provide a user with various status information on a small form factor display, and optionally providing the ability for the user to switch between the small and large status display when additional information regarding any status indicator is required.

BRIEF DESCRIPTION OF THE DRAWINGS

These and other objects and advantages of exemplary embodiments of the present invention will be better understood and appreciated in conjunction with the following detailed description of exemplary embodiments taken together with the accompanying drawings, in which.

DETAILED DESCRIPTION OF EXEMPLARY EMBODIMENTS

Figure 1:
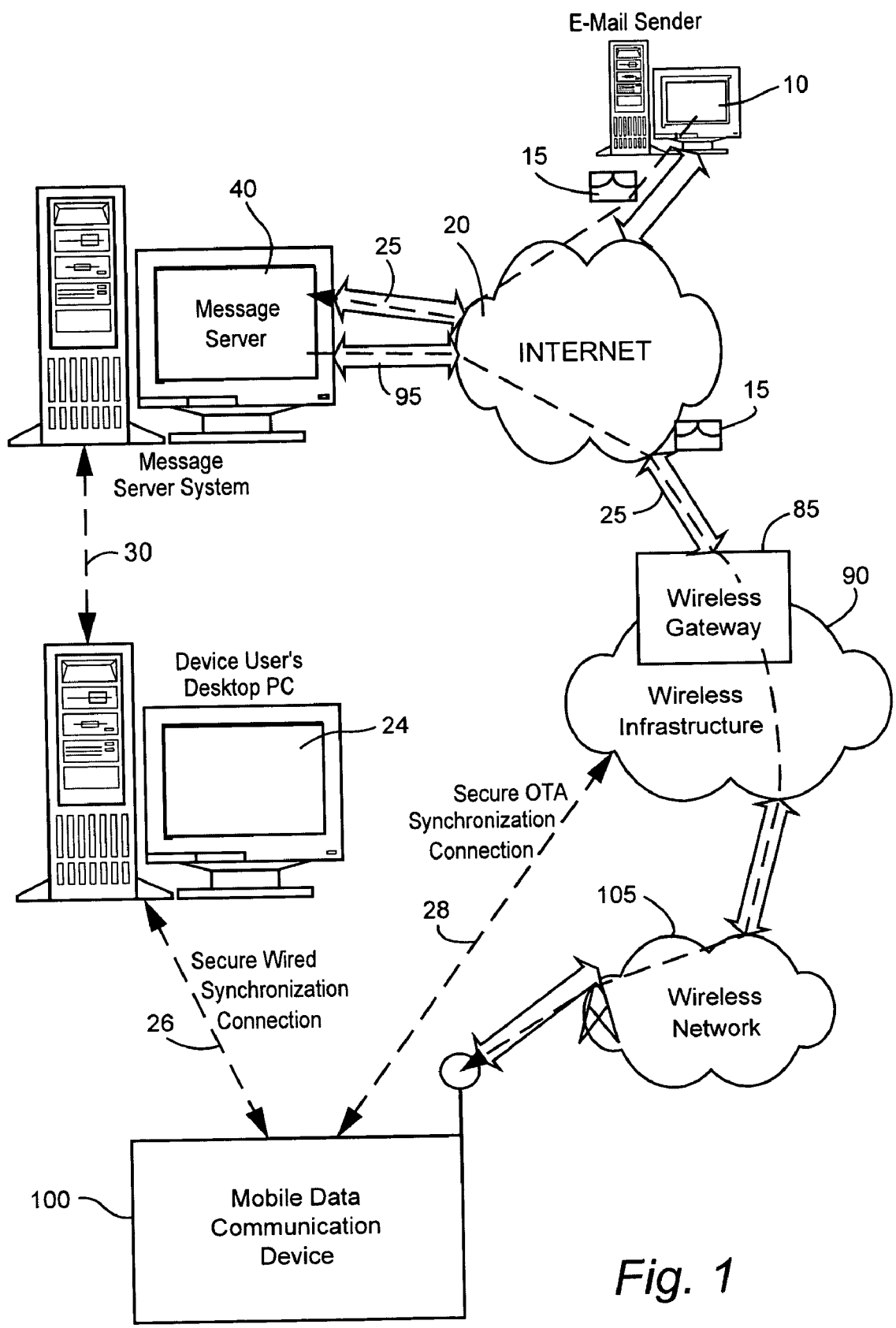
FIG. 1 is an overall system wide schematic view of an exemplary wireless e-mail communication system incorporating a mobile wireless communications device with the descriptive error messaging in accordance with an exemplary embodiment of the present invention.

FIG. 1 is an overview of an example communication system in which a wireless communication device may be used. One skilled in the art will appreciate that there may be hundreds of different topologies, but the system shown in FIG. 1 helps demonstrate the operation of the encoded message processing systems and methods described in the present application. There may also be many message senders and recipients. The simple system shown in FIG. 1 is for illustrative purposes only, and shows perhaps the most prevalent Internet e-mail environment where security is not generally used.

FIG. 1 shows an e-mail sender 10, the Internet 20, a message server system 40, a wireless gateway 85, wireless infrastructure 90, a wireless network 105 and a mobile communication device 100.

An e-mail sender system 10 may, for example, be connected to an ISP (Internet Service Provider) on which a user of the system 10 has an account, located within a company, possibly connected to a local area network (LAN), and connected to the Internet 20, or connected to the Internet 20 through a large ASP (application service provider) such as America Online (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 40 may be implemented, for example, on a network computer within the firewall of a corporation, a computer within an ISP or ASP system or the like, and acts as the main interface for e-mail exchange over the Internet 20. Although other messaging systems might not require a message server system 40, a mobile device 100 configured for receiving and possibly sending e-mail will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the secure message processing described below. Message servers such as server 40 typically extend beyond just e-mail sending and receiving; they also include dynamic database storage engines that have pre-defined database formats for data like calendars, to-do lists, task lists, e-mail and documentation.

The wireless gateway 85 and infrastructure 90 provide a link between the Internet 20 and wireless network 105. The wireless infrastructure 90 determines the most likely network for locating a given user and tracks the user as they roam between countries or networks. A message is then delivered to the mobile device 100 via wireless transmission, typically at a radio frequency (RF), from a base station in the wireless network 105 to the mobile device 100. The particular network 105 may be virtually any wireless network over which messages may be exchanged with a mobile communication device.

As shown in FIG. 1, a composed e-mail message 15 is sent by the e-mail sender 10, located somewhere on the Internet 20. This message 15 is normally fully in the clear and uses traditional Simple Mail Transfer Protocol (SMTP), RFC822 headers and Multipurpose Internet Mail Extension (MIME) body parts to define the format of the mail message. These techniques are all well known to those skilled in the art. The message 15 arrives at the message server 40 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific e-mail address associated with the mobile device 100. In a preferred embodiment described in further detail below, messages addressed to a message server account associated with a host system such as a home computer or office computer which belongs to the user of a mobile device 100 are redirected from the message server 40 to the mobile device 100 as they are received.

Regardless of the specific mechanism controlling the forwarding of messages to the mobile device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or T1 connections using the TCP/IP protocol used throughout the Internet. As used herein, the term "wireless network" is intended to include at least one of three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Groupe Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Figure 2:
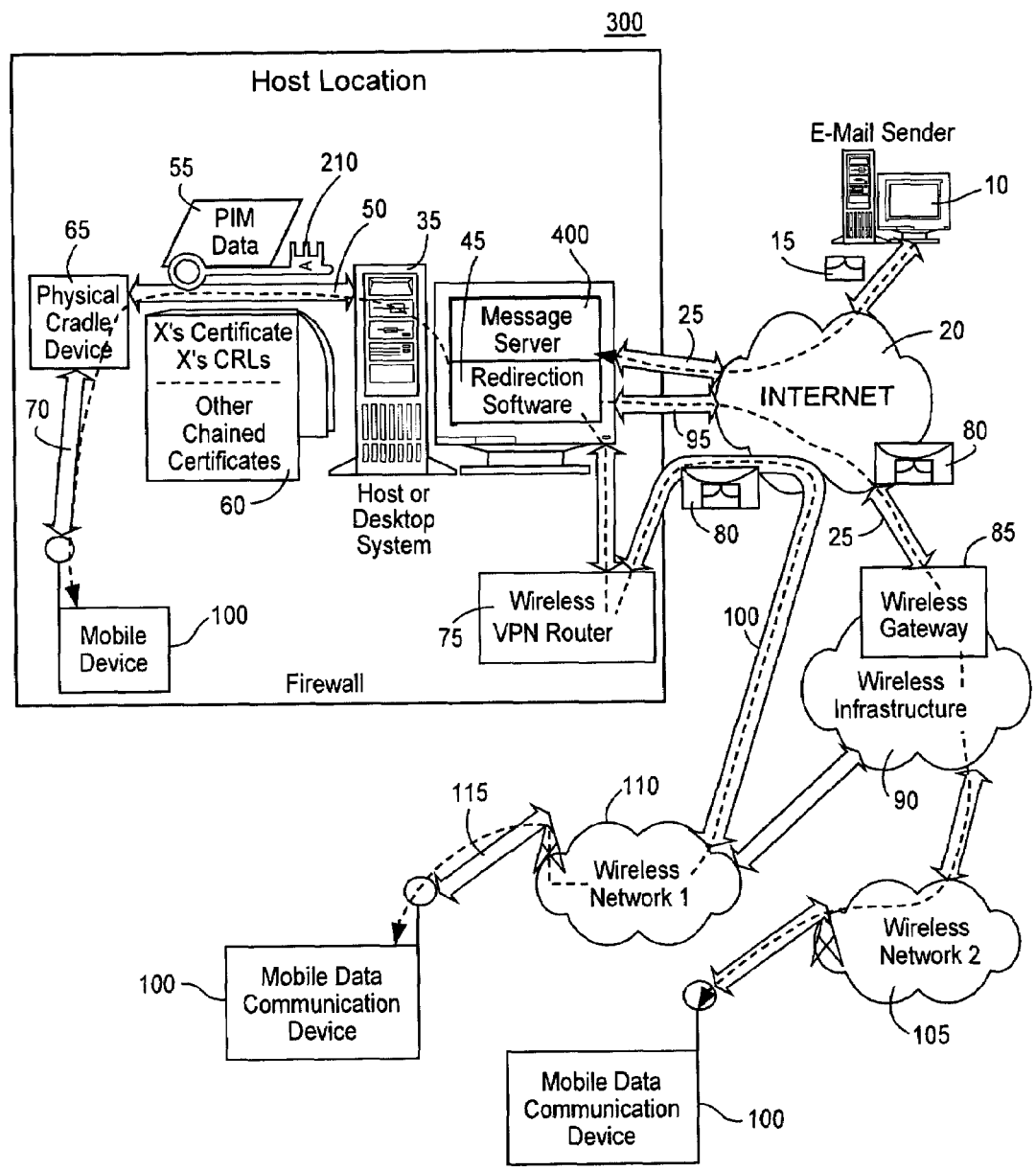
FIG. 2 is a block diagram of a further examplary communication system including multiple networks and multiple mobile communication devices.

FIG. 2 is a block diagram of a further example communication system including multiple networks and multiple mobile communication devices. The system of FIG. 2 is substantially similar to the FIG. 1 system, but includes a host system 300, a redirection program 45, a mobile device cradle 65, a wireless virtual private network (VPN) router 75, an additional wireless network 110 and multiple mobile communication devices 100. As described above in conjunction with FIG. 1, FIG. 2 represents an overview of a sample network topology. Although the encoded message processing systems and methods described herein may be applied to networks having many different topologies, the network of FIG. 2 is useful in understanding an automatic e-mail redirection system mentioned briefly above.

The central host system 300 will typically be a corporate office or other LAN, but may instead be a home office computer or some other private system where mail messages are being exchanged. Within the host system 300 is the message server 400, running on some computer within the firewall of the host system, that acts as the main interface for the host system to exchange e-mail with the Internet 20. In the system of FIG. 2, the redirection program 45 enables redirection of data items from the server 400 to a mobile communication device 100. Although the redirection program 45 is shown to reside on the same machine as the message server 400 for ease of presentation, there is no requirement that it must reside on the message server. The redirection program 45 and the message server 400 are designed to co-operate and interact to allow the pushing of information to mobile devices 100. In this installation, the redirection program 45 takes confidential and non-confidential corporate information for a specific user and redirects it out through the corporate firewall to mobile devices 100. A more detailed description of the redirection software 45 may be found in the commonly assigned U.S. Pat. No. 6,219,694 ("the '694 patent"), entitled "System and Method for Pushing Information From A Host System To A Mobile Data Communication Device Having A Shared Electronic Address", and issued to the assignee of the instant application on Apr. 17, 2001 which is hereby incorporated into the present application by reference. This push technique may use a wireless friendly encoding, compression and encryption technique to deliver all information to a mobile device, thus effectively extending the security firewall to include each mobile device 100 associated with the host system 300.

As shown in FIG. 2, there may be many alternative paths for getting information to the mobile device 100. One method for loading information onto the mobile device 100 is through a port designated 50, using a device cradle 65. This method tends to be useful for bulk information updates often performed at initialization of a mobile device 100 with the host system 300 or a computer 35 within the system 300. The other main method for data exchange is over-the-air using wireless networks to deliver the information. As shown in FIG. 2, this may be accomplished through a wireless VPN router 75 or through a traditional Internet connection 95 to a wireless gateway 85 and a wireless infrastructure 90, as described above. The concept of a wireless VPN router 75 is new in the wireless industry and implies that a VPN connection could be established directly through a specific wireless network 110 to a mobile device 100. The possibility of using a wireless VPN router 75 has only recently been available and could be used when the new Internet Protocol (IP) Version 6 (IPV6) arrives into IP-based wireless networks. This new protocol will provide enough IP addresses to dedicate an IP address to every mobile device 100 and thus make it possible to push information to a mobile device 100 at any time. A principal advantage of using this wireless VPN router 75 is that it could be an off-the-shelf VPN component, thus it would not require a separate wireless gateway 85 and wireless infrastructure 90 to be used. A VPN connection would preferably be a Transmission Control Protocol (TCP)/IP or User Datagram Protocol (UDP)/IP connection to deliver the messages directly to the mobile device 100. If a wireless VPN 75 is not available then a link 95 to the Internet 20 is the most common connection mechanism available and has been described above.

In the automatic redirection system of FIG. 2, a composed e-mail message 15 leaving the e-mail sender 10 arrives at the message server 400 and is redirected by the redirection program 45 to the mobile device 100. As this redirection takes place the message 15 is re-enveloped, as indicated at 80, and a possibly proprietary compression and encryption algorithm can then be applied to the original message 15. In this way, messages being read on the mobile device 100 are no less secure than if they were read on a desktop workstation such as 35 within the firewall. All messages exchanged between the redirection program 45 and the mobile device 100 preferably use this message repackaging technique. Another goal of this outer envelope is to maintain the addressing information of the original message except the sender's and the receiver's address. This allows reply messages to reach the appropriate destination, and also allows the "from" field to reflect the mobile user's desktop address. Using the user's e-mail address from the mobile device 100 allows the received message to appear as though the message originated from the user's desktop system 35 rather than the mobile device 100.

With reference back to the port 50 and cradle 65 connectivity to the mobile device 100, this connection path offers many advantages for enabling one-time data exchange of large items. For those skilled in the art of personal digital assistants (PDAs) and synchronization, the most common data exchanged over this link is Personal Information Management (PIM) data 55. When exchanged for the first time this data tends to be large in quantity, bulky in nature and requires a large bandwidth to get loaded onto the mobile device 100 where it can be used on the road. This serial link may also be used for other purposes, including setting up a private security key 111 such as an S/MIME or PGP specific private key, the Certificate (Cert) of the user and their Certificate Revocation Lists (CRLs) 60. The private key is preferably exchanged so that the desktop 35 and mobile device 100 share one personality and one method for accessing all mail. The Cert and CRLs are normally exchanged over such a link because they represent a large amount of the data that is required by the device for S/MIME, PGP and other public key security methods.

Figure 3:
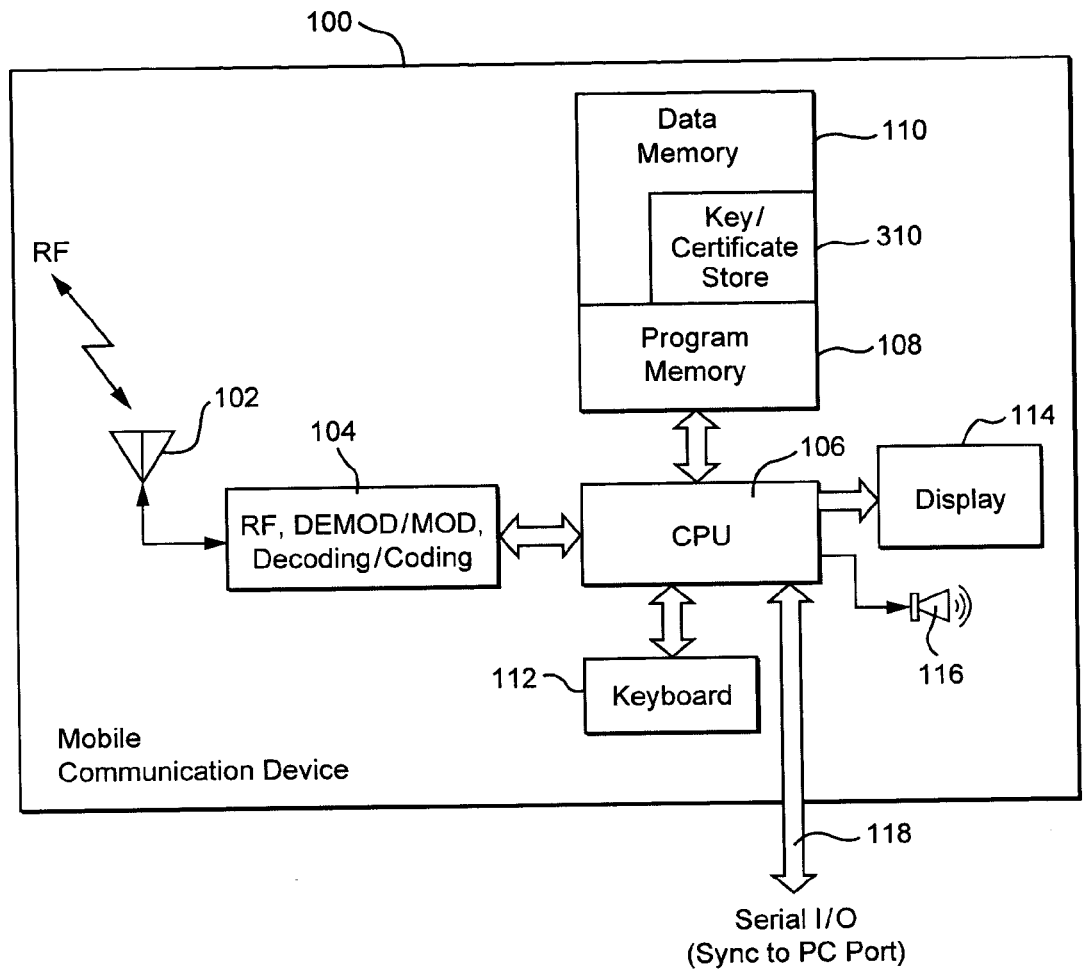
FIG. 3 is an abbreviated schematic diagram of hardware included within an exemplary mobile wireless communications device.

As depicted in FIG. 3, mobile communications device 100 includes a suitable RF antenna 102 for wireless communication to/from wireless network 20. Conventional RF, demodulation/modulation and decoding/coding circuits 104 are provided. As those in the art will appreciate, such circuits may involve possibly many digital signal processors (DSPs), microprocessors, filters, analog and digital circuits and the like. However, since such circuitry is well known in the art, it is not further described herein.

The mobile communications device 100 will also typically include a main control CPU 106 that operates under the control of a stored program in program memory 108, and which has access to data memory 110. CPU 106 also communicates with a conventional keyboard 112 and display 114 (for example, a liquid crystal display or LCD) and audio transducer or speaker 116. A portion of the data memory 310 is available for storing data required for decrypting encrypted messages, such as, for example, private keys, digital certificates, and the like. Suitable computer program executable code is stored in portions of the program memory 108 to constitute stored program logic for receiving and using new or added private keys and/or digital certificates or the like as described below (for example, via a wired serial I/O port or the wireless RF antenna 102).

As depicted in FIG. 1, a secure wired synchronization connection 26 (for example, between serial I/O ports of the user's base unit 24 and the wireless device 100) is typically provided for normal data synchronization purposes (for example, to synchronize databases in the two devices with respect to such things as calendars, to-do lists, task lists, address books, etc.). Part of prior data synchronization processes has included a program logic such as Cert Sync for maintaining synchronization between cryptographic message certificates. If a secure over the air (OTA) synchronization connection 28 is available, it may also be used by Cert Sync to maintain synchronization of cryptographic message certificates.

As previously described, there is a communications link (for example, depicted in dotted lines at 30 in FIG. 1) typically found between the device user's base unit 24 and a system message server 14. Accordingly, there is an existing communication path that may be utilized for passing synchronization data from the user's base unit 24 via channel 30, the server 14, Internet 12, wireless gateway 16 and wireless infrastructure 18 via the OTA synchronization connection 28.

Figure 4:
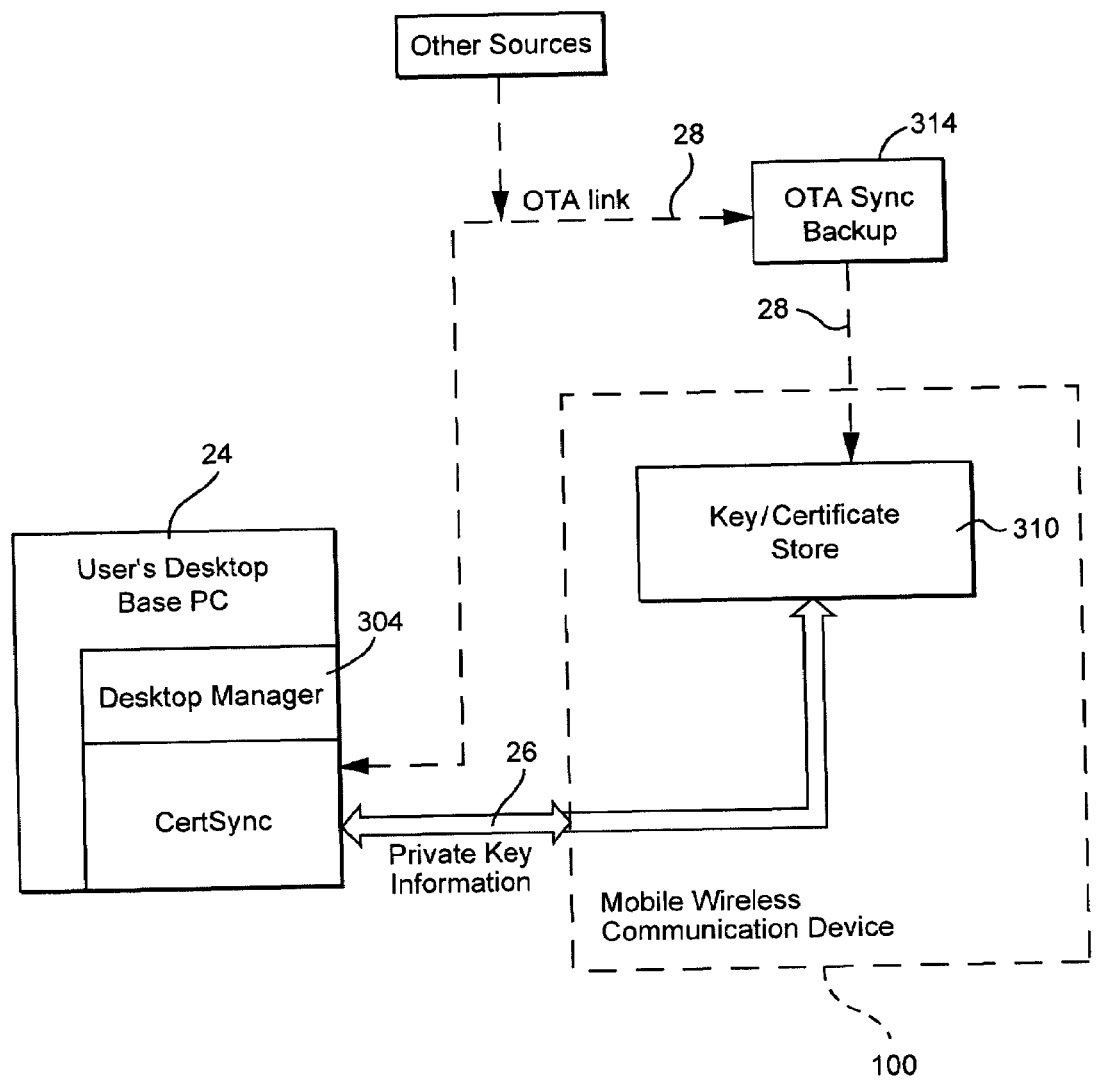
FIG. 4 is an abbreviated schematic functional diagram of the hardware/software utilized to achieve updating of the mobile wireless communication device in the exemplary embodiment of FIG. 1.

As depicted in FIG. 4, the user's base unit 24 may be used to update the mobile wireless communications device 100 with information including, for example, private key information and digital certificate information. The user's base station 24 is typically a desktop PC, and may be of conventional hardware and operating system design. It will typically include desktop manager program logic 304 (in the form of, for example, executable computer program logic) for managing, among other things, a normal data synchronization connection to device 100. As previously mentioned, in the environment of mobile wireless communications systems, such a desktop manager may typically include logic for synchronizing cryptographic message certificates. Such logic is denoted here as Cert Sync. Optionally, an OTA synchronization connection may also be available via an OTA link 28 and OTA sync backup 314.

E-mail messages generated using the S/MIME and PGP techniques may include encrypted information, a digital signature on the message contents, or both. In encrypted S/MIME message operations, a one-time session key is generated and used to encrypt the body of the message, typically with a symmetric cipher, such as, for example, Triple DES. The session key is then encrypted using the receiver's public key, typically with a public key encryption algorithm like RSA. If the message is addressed to more than one receiver, the same session key is encrypted using the public key of each receiver. The encrypted message body, as well as all encrypted session keys, is sent to every receiver. Each receiver must then locate its own session key, possibly based on a generated Recipient Info summary of the receivers that may be attached to the message, and decrypt the session key using its private key. Once the session key is decrypted, it is then used to decrypt the message body. The S/MIME Recipient Info attachment can also specify the particular encryption scheme that must be used to decrypt the message. This information is normally placed in the header of the S/MIME message. Those skilled in the art will appreciate that these operations relate to an illustrative example of S/MIME messaging and its associated encoding operations, namely encryption. It will also be understood that the instant disclosure is in no way limited thereto.

Figure 5:
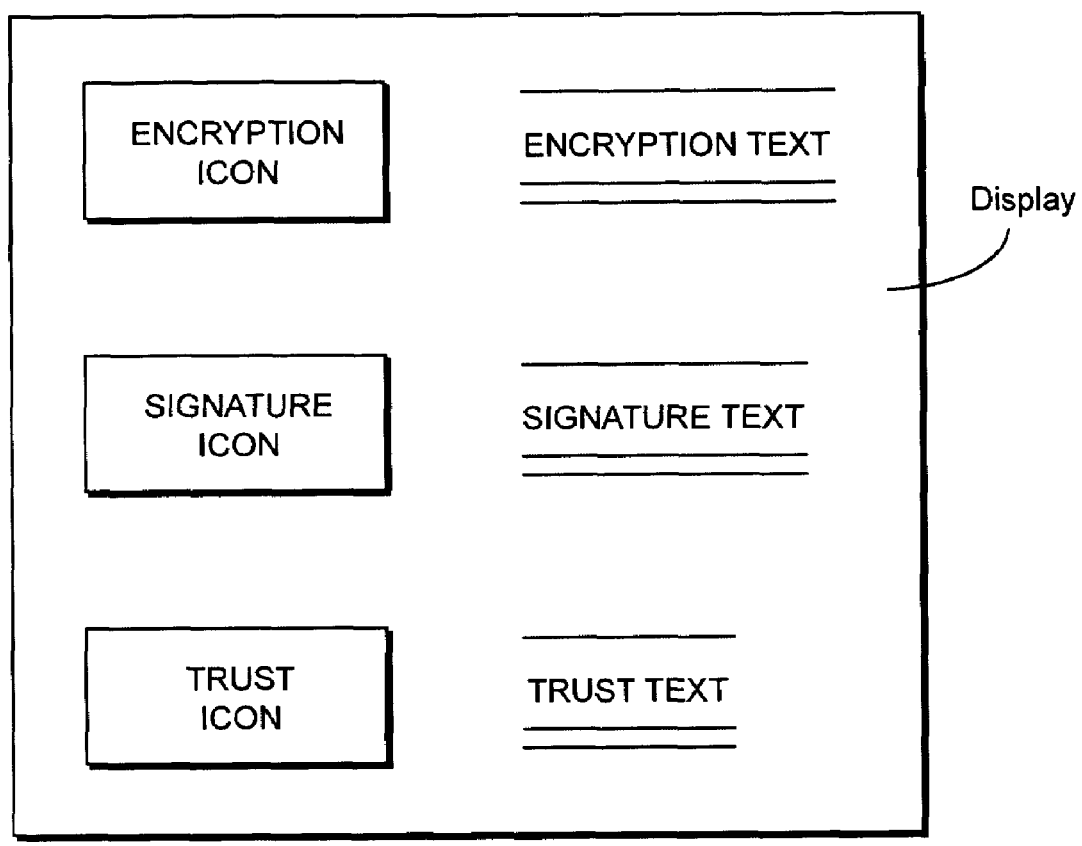
FIG. 5 is an illustrative schematic diagram showing an exemplary large form factor security status display.

FIG. 5 illustrates an exemplary large status display for secure messages. As discussed above, the large status display typically includes a number of icons, each appearing on a separate area of the display and displayed vertically. Each of the status icons has associated text appearing next to the icons. In a typical large status display, this text includes various information relating to the icon with which it is associated. This text can be very lengthy and can take up many lines of the display, such as, for example, as many as three lines or more of text in the display.

Figure 6:
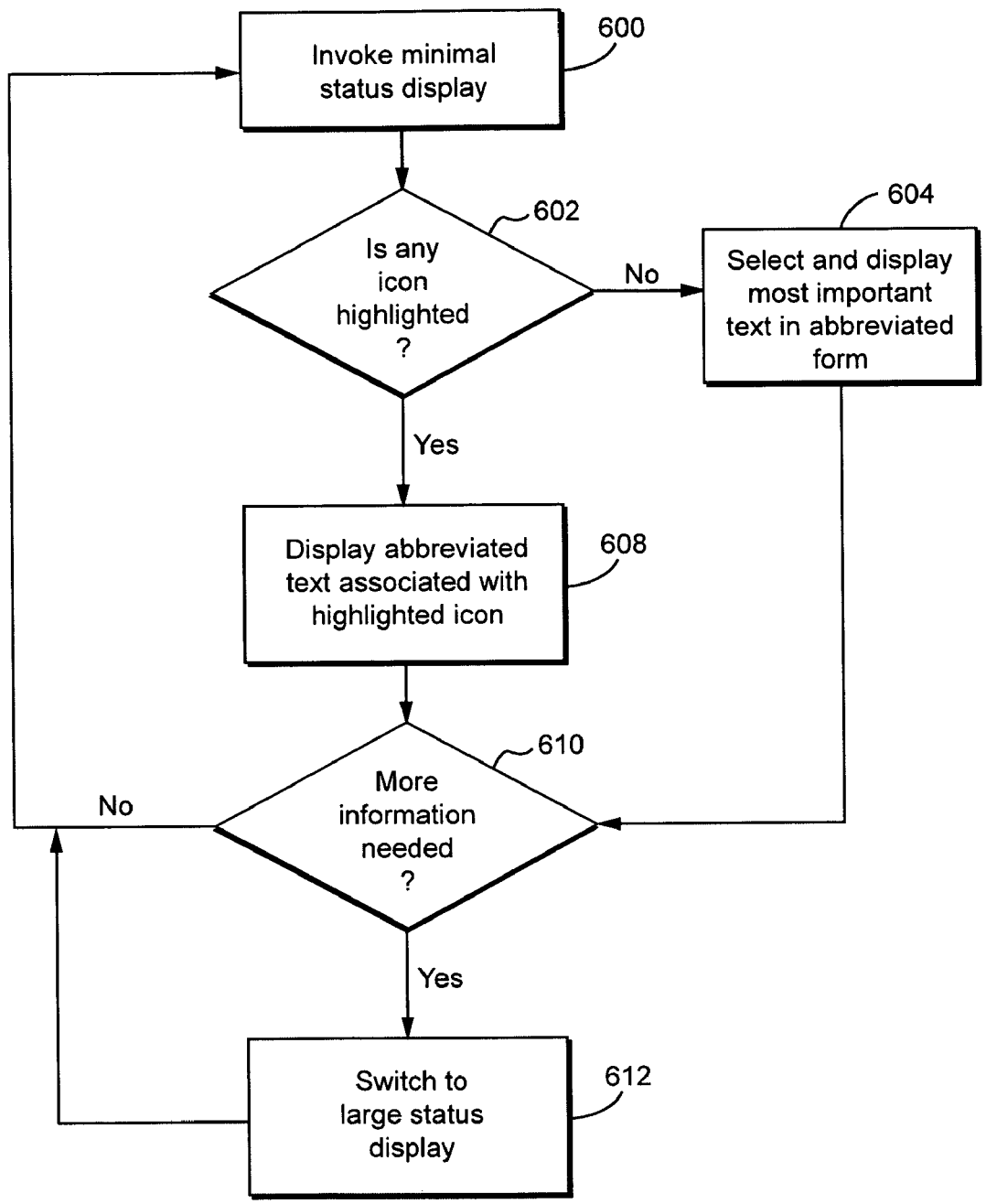
FIG. 6 is an exemplary abbreviated schematic flow diagram illustrating an exemplary operation using a status display according to an exemplary embodiment of the present invention.

FIG. 6 is an exemplary flow diagram illustrating operation of the minimal or small status display according to a preferred embodiment. At the outset, the user must select how the wireless mobile communications device (not shown) should display the status information. The user may select to invoke the small or minimal status display according to an exemplary embodiment of the invention 600. Accordingly, icons representing various status information will be displayed. Preferably, the icons will be displayed along a single row of the device display, however, any economy in display area is acceptable. The text associated with each of the icons may also be abbreviated using, for example, keywords that sufficiently represent the context of the original text to enable a user to determine at least at a rudimentary level, what the status relating to a particular icon may be indicating. Next, a determination is made as to whether any of the small status icons are highlighted 602. If no particular icon is highlighted, the display of the mobile wireless communications device may display the abbreviated status text portion to reflect the status of highest importance for a particular message 604. For example, an error message may be of highest importance, whereas a simple indication that a particular message is encrypted may be of a relatively low importance. As discussed above, the priority scheme associated with the relative message importance is determined, for example, in accordance with the designer's preference. If the user optionally highlights an icon of interest 602, abbreviated text associated with the highlighted icon will be displayed 608. If the abbreviated text of step 608 does not provide sufficient information to the user, and the user desires to display more information 608, the user may opt to switch the display to the large status display format 612. Upon viewing the large status display information, the user may return to the default minimal status display 600. Moreover, if the user has sufficient information in step 610, the small status display 600 is maintained.

Figure 7:
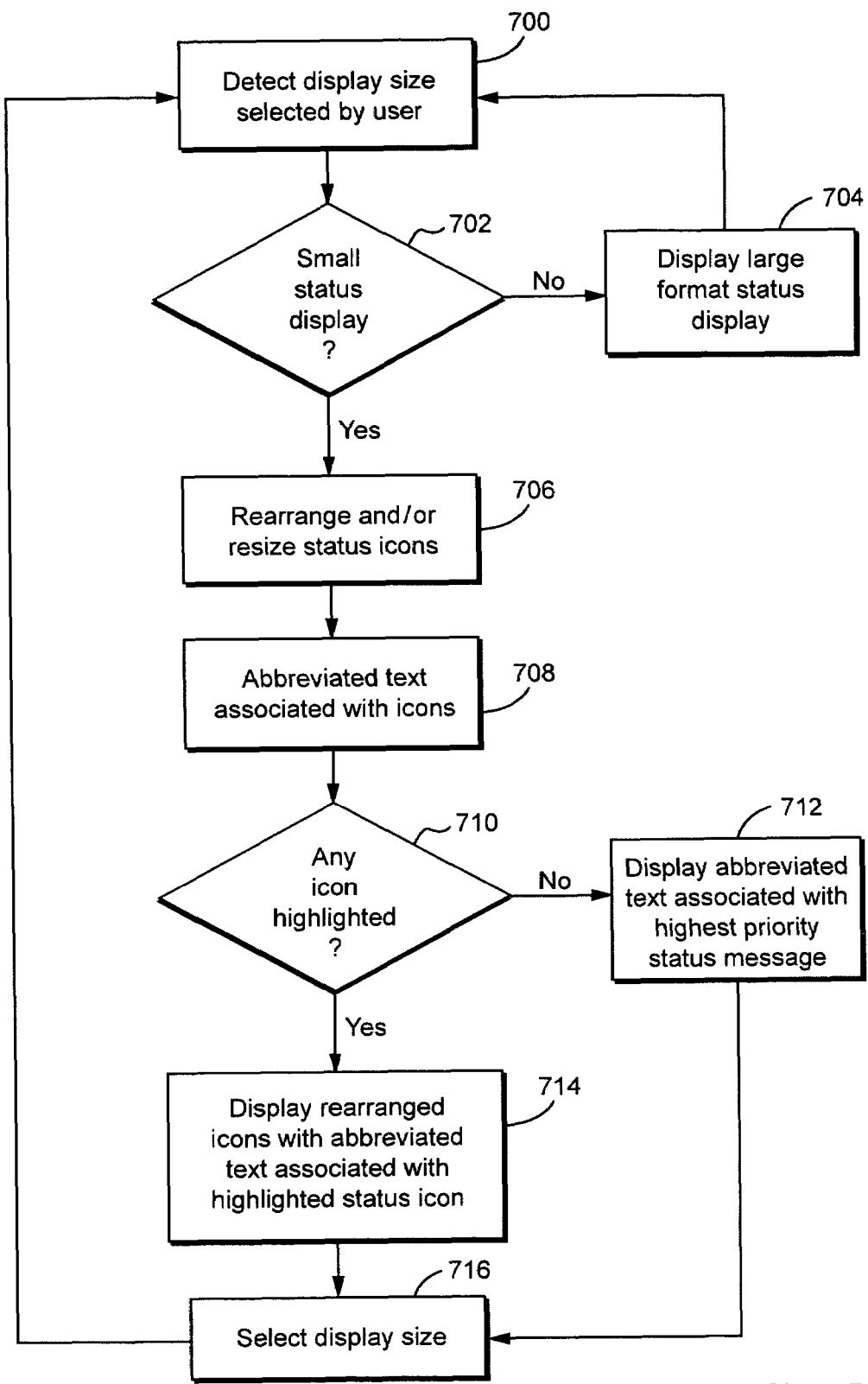
FIG. 7 is an exemplary abbreviated schematic flow diagram illustrating an exemplary manner of generating a status display according to an exemplary embodiment of the present invention.

FIG. 7 is an illustrative flow diagram showing an exemplary manner of generating an exemplary status display according to an exemplary embodiment. The display size selected by the user is detected by the device 700. If a small status display is selected at decision block 702, the device goes on to generate a small status display as will be discussed herein. If a large status display is selected 702, then the device will display the status icons and associated text in the normal large format 704. On the other hand, if the small status display is selected by the user 702, the security status icons are rearranged and/or resized 706. Additionally, the text associated with each of the security status icons may be abbreviated using, for example, keyword representations of the text messages 708. If no status icon is highlighted by the user 710, the display will show the rearranged and/or resized security status icons together with the abbreviated text associated with the message of highest priority 712. The priority of the associated text messages is determined as set forth above. If any security status icon is selected or highlighted by the user 710, the abbreviated text associated with the highlighted icon is displayed together with the rearranged and/or resized security status icons 714. The user may then switch the size of the security status display 716 to obtain more information regarding the various security status icons and the full text associated therewith.

Figure 8A:
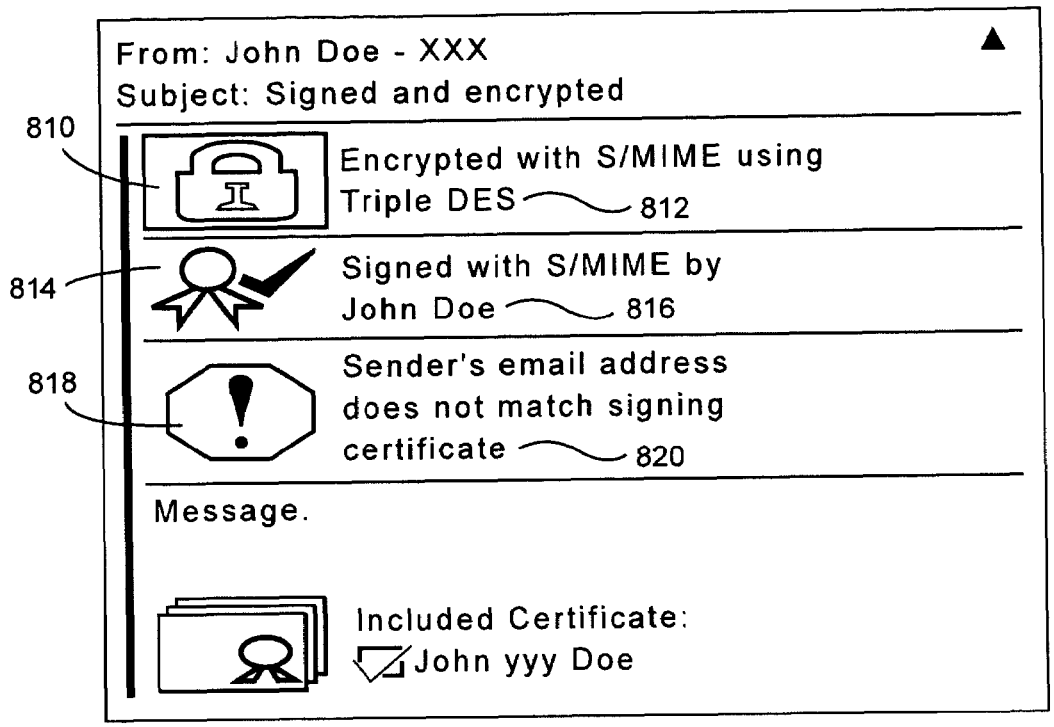
FIGS. 8A-8E are exemplary illustrative screens showing an example large format display and corresponding small or minimal status display for three exemplary status indicators.

FIG. 8A-8E are illustrative depictions showing exemplary status displays according to an exemplary preferred embodiment. FIG. 8A is an example large status display illustrating the use of three status indicators. For example, the first status indicator 810 is an encryption icon. The encryption icon 810 is accompanied with text 812 indicating certain details relating to the encryption icon. A second exemplary icon may be a signature status icon 814, that is displayed together with text 816 relating to the signature status icon 814. Another exemplary status icon may be a trust status icon 818, that is displayed together with text relating to the trust status icon 818. In this particular illustration, the encryption and signature status icons 810, 814 do not indicate any errors, but the trust icon 818 has a problem as indicated by accompanying text 820. In this example, an error, such as that associated with the trust icon 818 might have the highest priority and would be displayed if no icon is highlighted.

Figure 8B:
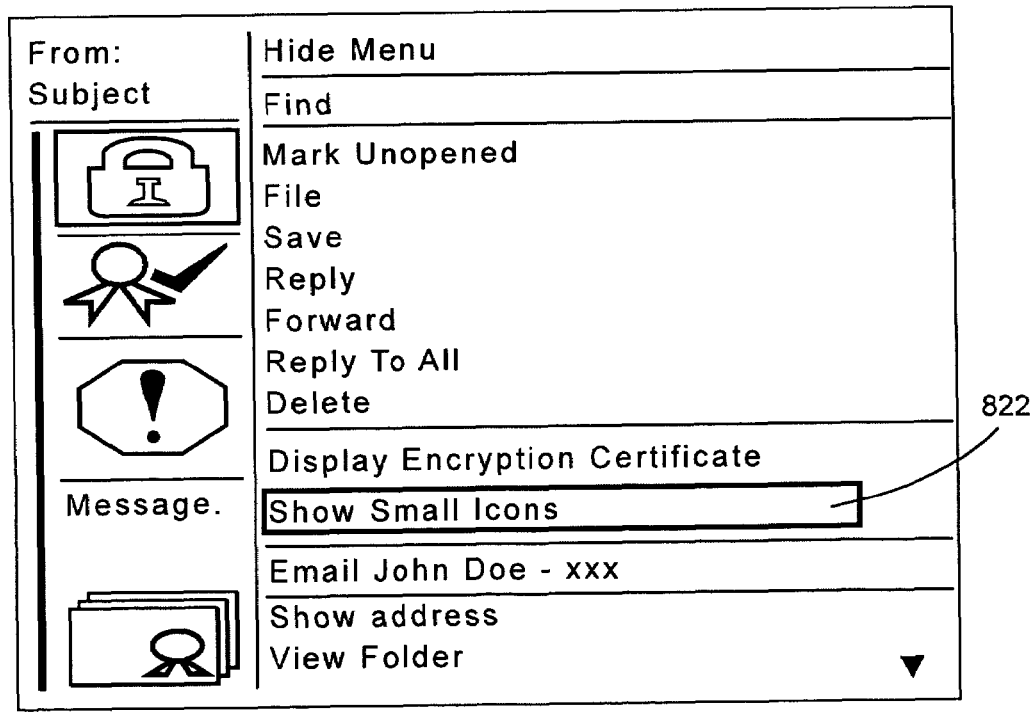
Figure 8C:
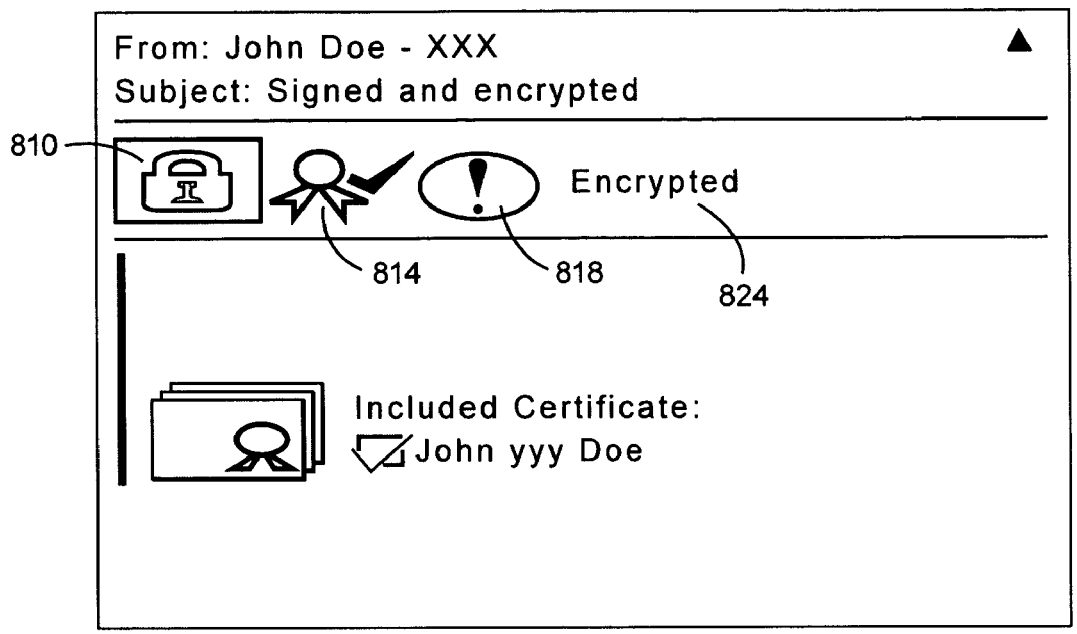
Figure 8D:
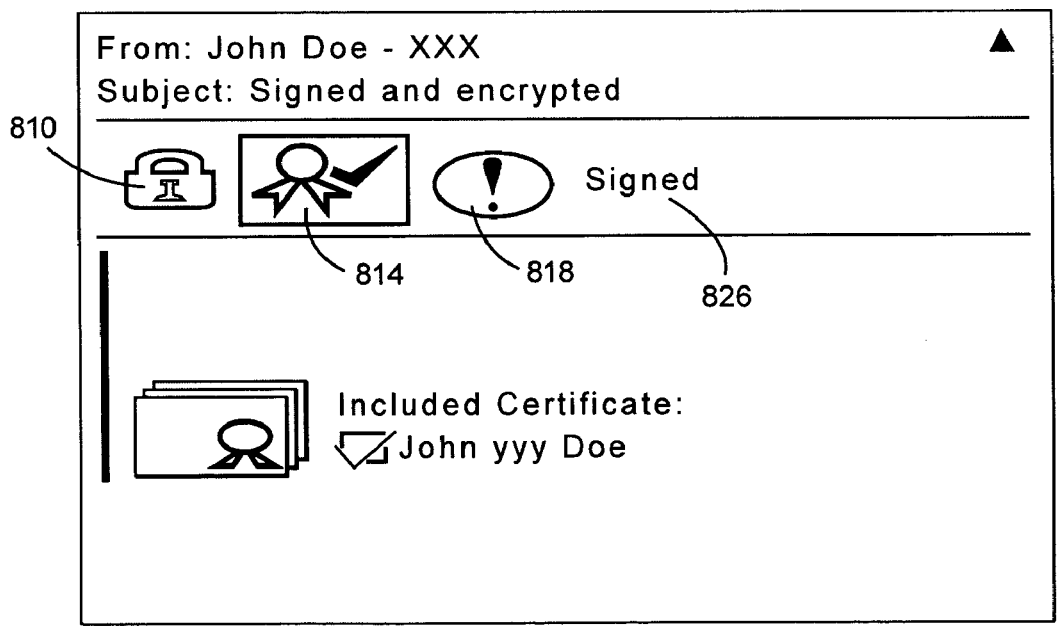
Figure 8E:
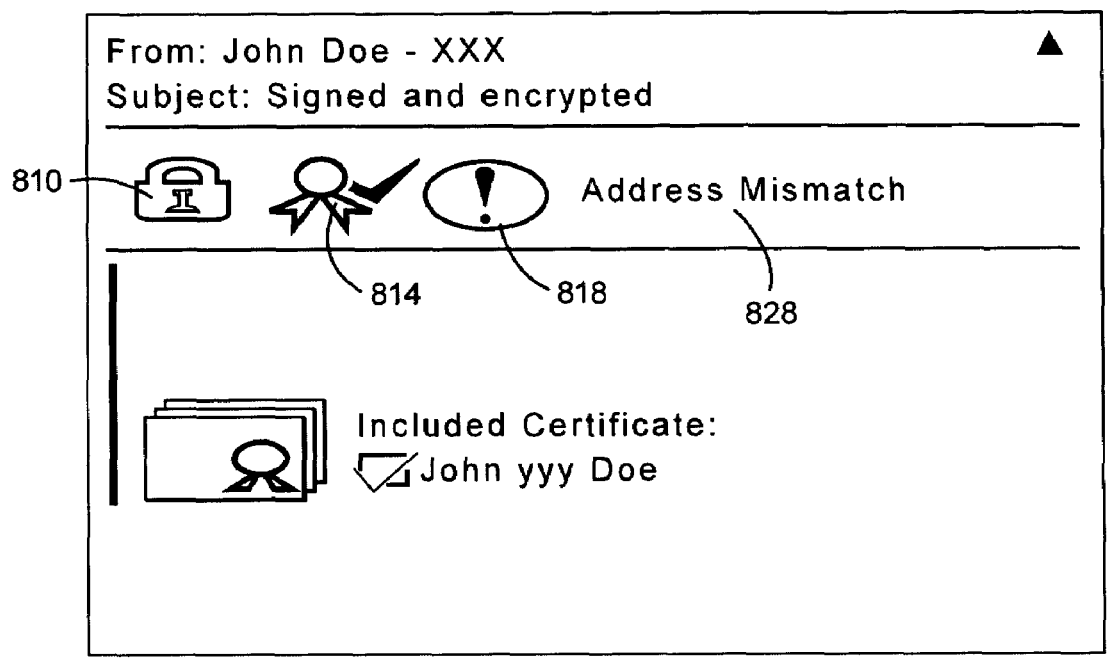
Figure 9A:
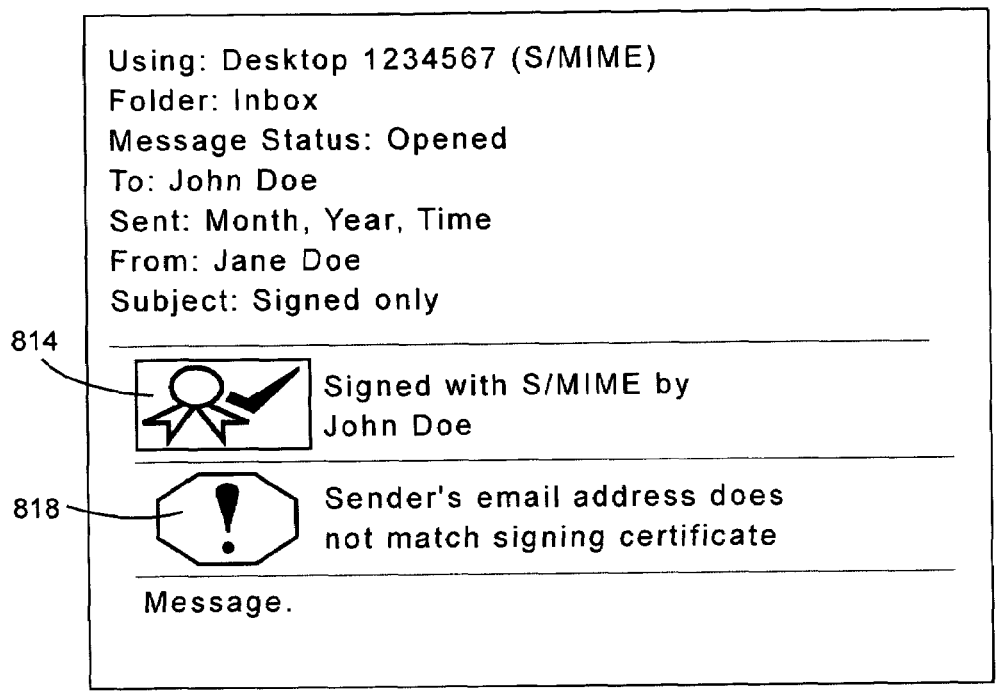
FIGS. 9A-9D are exemplary illustrative screens showing an example large format display and corresponding small or minimal status display for two exemplary status indicators.
Figure 9B:
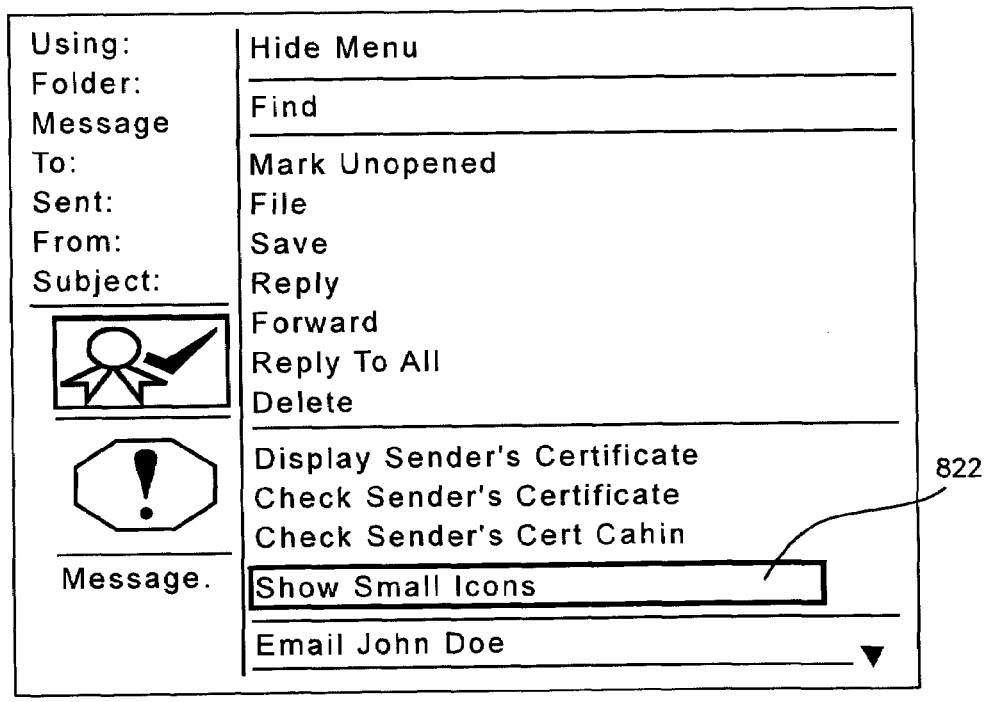
Figure 9C:
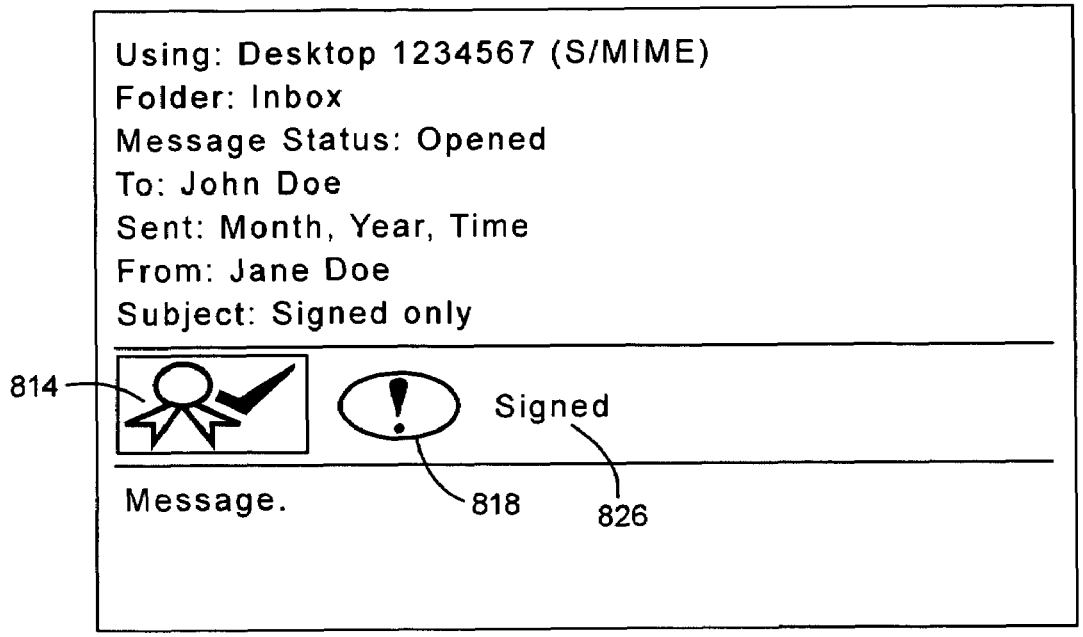
Figure 9D:
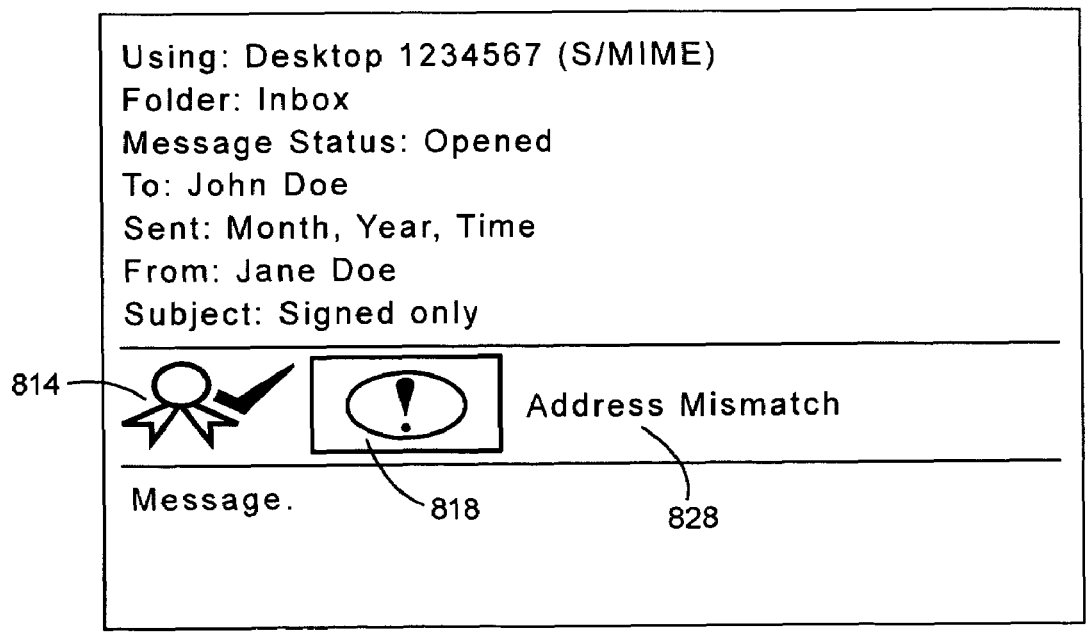

FIG. 8B is an example of a user menu that allows the user to select the option of displaying small status icons 822. Upon selection of the small status icon option, the display may show the status icons and abbreviated text as illustrated in FIG. 8C. In FIG. 8C, all of the status icons 810, 814 and 818 are displayed in a small format and all on one line, and the encryption icon 810 has been highlighted using the cursor. The text accompanying the small format icons shows an abbreviated message 824 relating to the first icon, in this illustrative case, the encryption icon 810. This text is displayed in this example because the icon has been highlighted by the user. In FIG. 8D the user has highlighted the signature status icon 814, and the text display 826 is an abbreviated indication of the status of the signature status icon 814. In FIG. 8E, the trust status icon 818 together with an abbreviated text message 828 associated therewith is displayed. As discussed above, if no specific status icon is highlighted by the user, the mobile wireless communications device may display the status text portion to reflect the status of highest importance for a particular message. For example, an error message may be of highest importance, whereas a simple indication that a particular message is encrypted may be of a relatively low importance. As discussed above, the priority scheme associated with the relative message importance is determined, for example, in accordance with the designer's preference.

FIGS. 9A-9D are similar to FIGS. 8A-8D, but relate to an example wherein there are only two status icons with related text.

It will be understood that the above minimal status display described with respect to status messages for secure e-mail messages is intended to be illustrative only. It will be apparent to those skilled in the art that this type of minimal status display has wide ranging application in unlimited and innumerable applications, especially those encountered in the computer, communications and electronics fields. Thus, the exemplary embodiment described above may be equally applicable to use in mobile phones, mobile computing applications, data processing and the like, where status indicators and relevant text are required.

What is claimed is:

1. An electronic communications device comprising:
a receiver for receiving secured electronic messages;
a processor capable of processing said secured electronic messages and displaying said secured electronic messages; and
program logic operable to generate a large status display having a first display size, in a first display mode;
wherein the large status display comprises a plurality of security status icons each associated with a status of a secured electronic message, and, for each of the plurality of security status icons, text corresponding to the security status icon;
wherein said program logic is further operable to generate a small status display having a second display size smaller than the first display size, in a second display mode;
wherein said small status display comprises said plurality of security status icons, each associated with a status of said secured electronic message, and rearranged to reduce an amount of display area used to display said security status icons and, for exactly one of the plurality of security status icons, text corresponding to the exactly one of the plurality of security status icons in an abbreviated form to reduce an amount of display area used to display said text corresponding to the exactly one of the plurality of security status icons;
wherein each of said plurality of security status icons is associated with a different status of said secured electronic message;
wherein said program logic is further operable to, based on user input, switch between said first and second display modes for respectively displaying exactly one of said large status display having said first display size and said small status display having said second display size; and
wherein the text corresponding to the exactly one of the plurality of security status icons of said small status display corresponds to a most important security status message, a priority of importance of said text corresponding to the exactly one of the plurality of security status icons being based on predetermined criteria associated with at least one status of said secured electronic message.

2. The electronic communications device of claim 1, wherein each of the plurality of security status icons is further selectable, and wherein the text corresponding to the exactly one of the plurality of security status icons of said small status display corresponds to a selected security status icon.

3. The electronic communications device of claim 1, wherein said security status icons and text corresponding to the exactly one of the plurality of security status icons are displayed on a single row of the small status display.

4. The electronic communications device of claim 1, wherein said large status display provides more detailed information than the small status display.

5. The electronic communications device of claim 1, wherein said electronic communications device comprises a mobile wireless communications device.

6. The electronic communications device of claim 1, wherein said program logic is resident on said electronic communications device.

7. A wireless communications device comprising:
a processor capable of processing secured electronic messages received by the wireless communications device; and
program logic operable to generate a large status display in a first display area, in a first display mode;
wherein the large status display comprises a plurality of security status icons each associated with a status of a secured electronic message, and, for each of the plurality of security status icons, text corresponding to the security status icon;
said program logic being further operable to generate a small status display in a second display area in a second display mode, said second display area being smaller than said first display area;
wherein said small status display is generated by rearranging said plurality of security status icons, each associated with a status of said secured electronic message, to reduce an amount of said second display area used to display said security status icons, and displaying, for exactly one of the plurality of security status icons, text corresponding to the exactly one of the plurality of security status icons in an abbreviated form to reduce an amount of the second display area used to display said text corresponding to the exactly one of the plurality of security status icons;

wherein each of said plurality of security status icons is associated with a different status of said secured electronic message;

wherein said program logic is further operable to, based on user input, switch between said first and second display modes for respectively displaying exactly one of said large status display and said small status display; and wherein the text corresponding to the exactly one of the plurality of security status icons of said small status display corresponds to a most important security status message, a priority of importance of said text corresponding to the exactly one of the plurality of security status icons being based on predetermined criteria associated with at least one status of said secured electronic message.

8. The wireless communications device of claim 7, wherein each of the plurality of security status icons is further selectable, and wherein the text corresponding to the exactly one of the plurality of security status icons of said small status display corresponds to a selected security status icon.

9. The wireless communications device of claim 7, wherein said security status icons and text corresponding to the exactly one of the plurality of security status icons are displayed on a single row of the small status display.

10. The electronic communications device of claim 7, wherein said large status display provides more detailed information than the small status display.

11. A wireless communications device comprising:
means for receiving secured electronic messages;
means for processing said secured electronic messages and displaying said secured electronic messages; and
means operable to generate a large status display in a first display area in a first display mode, to generate a small status display in a second display mode, and to switch, based on user input, between the first and second display modes, to display exactly one of said large status display and said small status display;
wherein the large status display comprises a plurality of security status icons each associated with a status of a secured electronic message, and, for each of the plurality of security status icons, text corresponding to the security status icon;
wherein said second display area is smaller than said first display area;
wherein said small status display comprises said plurality of security status icons rearranged, each security status icon associated with a status of said secured electronic message, and for exactly one of the plurality of security status icons, text corresponding to the exactly one of the plurality of security status icons in an abbreviated form;
wherein each of said plurality of security status icons is associated with a different status of said secured electronic message;
wherein the text corresponding to the exactly one of the plurality of security status icons of said small status display corresponds to a most important security status message, a priority of importance of said text corresponding to the exactly one of the plurality of security status icons being based on predetermined criteria associated with at least one status of said secured electronic message.

12. A method of displaying status on a wireless communications device comprising:
receiving a secured electronic message on said wireless communications device;
processing the received secured electronic message for display on said wireless communications device;
generating, in a first display area, in a first display mode, a large status display comprising a plurality of security status icons each indicating a status of said secured electronic message, and, for each of the plurality of security status icons, text corresponding to the security status icon;
generating a small status display in a second display area smaller than said first display area in a second display mode, by rearranging said plurality of security status icons, each indicating a status of said secured electronic message;
generating, for exactly one of the plurality of security status icons, text corresponding to the exactly one of the plurality of security status icons in an abbreviated form;
wherein each of said plurality of security status icons is associated with a different status of said secured electronic message;
displaying said rearranged status icons and text corresponding to the exactly one of the plurality of security status icons in said second display area; and
switching, based on user input, between said first and second display modes so as to respectively display exactly one of the large status display and the small status display
wherein the text corresponding to the exactly one of the plurality of security status icons of said small status display corresponds to a most important security status message, a priority of importance of said text corresponding to the exactly one of the plurality of security status icons being based on predetermined criteria associated with at least one status of said secured electronic message.

13. The method of claim 12, wherein each of the plurality of security status icons is further selectable, and wherein the text corresponding to the exactly one of the plurality of security status icons of said small status display corresponds to a selected security status icon.

14. The method of claim 12, wherein said security status icons and text corresponding to the exactly one of the plurality of security status icons are displayed on a single row of the small status display.

15. The method of claim 12, wherein text of the large status display provides more detailed information than text of the small status display.

16. The device of claim 11, wherein each of the plurality of security status icons is further selectable, and wherein the text corresponding to the exactly one of the plurality of security status icons of said small status display corresponds to a selected security status icon.

17. The device of claim 11, wherein said security status icons and text corresponding to the exactly one of the plurality of security status icons are displayed on a single row of the small status display.

18. The device of claim 11, wherein text of the large status display provides more detailed information than text of the small status display.

* * * * *